March 8, 1966 Q. R. HATHCOCK 3,239,124
PNEUMATIC DESOLDERING TIP
Filed Oct. 4, 1963
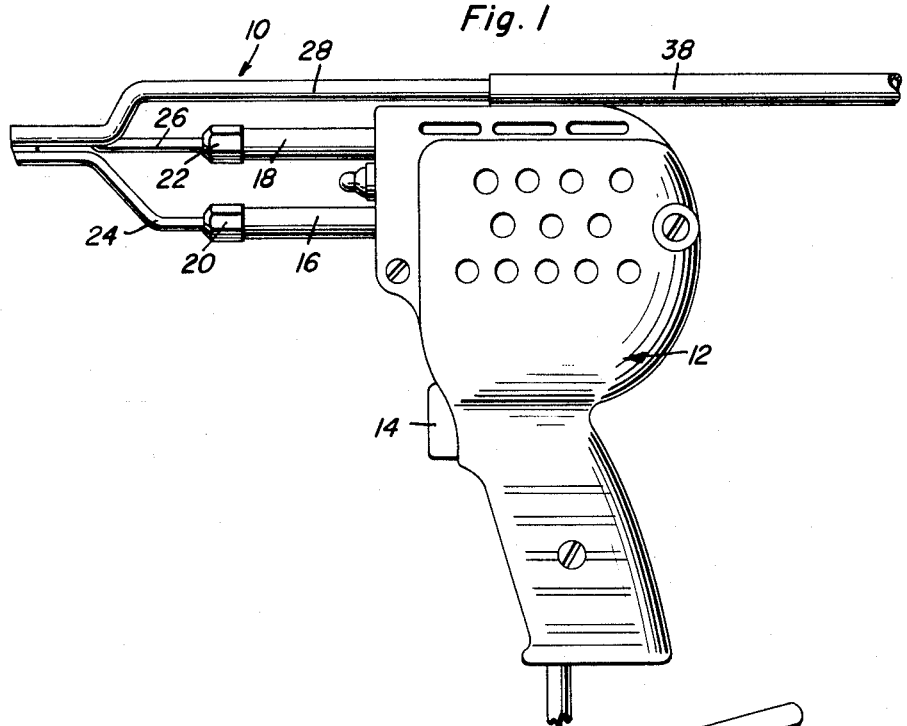
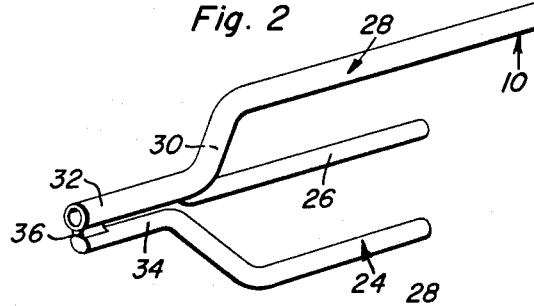
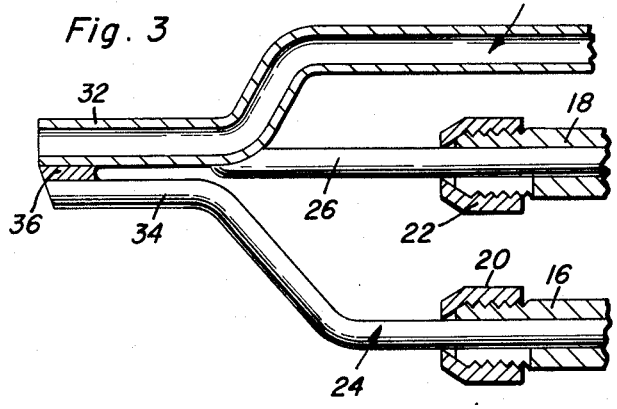
Quentin R. Hathcock
INVENTOR.

United States Patent Office 3,239,124
Patented Mar. 8, 1966

3,239,124
PNEUMATIC DESOLDERING TIP
Quentin R. Hathcock, 484 Cook St., Concord, N.C.
Filed Oct. 4, 1963, Ser. No. 313,871
4 Claims. (Cl. 228—20)

This invention primarily relates to a pneumatic desoldering tip adapted to be mounted upon conventional soldering gun which are particularly designed for use in connecting television and radio printed circuit boards.

In the assembly and repair of television and radio sets, especially those having printed circuits, an electric soldering gun or iron is employed in effecting removal and attachment of components and removing soldering previously applied thereto. A conventional tip for a soldering iron or gun melts the solder, but the removal of the wasted melted solder from the immediate working surface is a problem.

It is the immediate object of the instant invention to device a pneumatic cleaning and soldering tip which may be held and inserted in a conventional electric soldering gun the same as any conventional tip and which includes pneumatic means for blowing away accumulated wasted solder as the solder is melted and applied.

It is another object of this invention to disclose a soldering tip of the character indicated which is simple, inexpensive to manufacture and less cumbersome than any of the previous prior art devices now in use.

In order to carry out the aforementioned objects of the invention, it is a more specific object of this invention to modify a conventional soldering iron tip by removing the anterior upper portion of the conventional tip and replacing it with a tube of heat conductive metal such as brass or stainless steel.

The remaining portions of the conventional soldering iron tip are attached to the tubular member whereby the extreme ends of the tube may be used as a portion of the melting tip.

Yet another object of this invention resides in the manner of joining the tubular tip portion to the conventional iron tip by brazing or hard solder whereby the solder heating surface of said tip may be increased.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a side elevational view of the desoldering tip comprising the subject matter of the instant invention shown attached to a conventional soldering gun.

FIGURE 2 is a perspective view of the desoldering tip.

FIGURE 3 is a fragmentary longitudinal section through the desoldering tip with the heating arms shown in elevation.

The desoldering tip comprising the subject matter of the instant invention is generally designated by the numeral 10 and is adapted to be mounted upon a conventional soldering gun such as 12 having a controlling switch trigger 14 and main conducting arms 16 and 18. Arms 16 and 18 have conventional end clamps 20 and 22, respectively, for normally mounting the removable heating arms of a soldering tip.

The desoldering tip 10 includes conventional heating arms 24 and 26 which are normally received within the main conducting arms 16 and 18 respectively. However, the conventional tip has been modified by the removal of the anterior portion of the arm 26. Substituted for this removed portion is a tubular arm 28 having an offset portion 30 and a straight portion 32 at the anterior thereof. The portion 32 of the tubular arm 28 is joined by brazing or with "silver" or hard solder to the anterior portion 34 of the heating arm 24. Therefore, the arms 24 and 28 form a generally Y-shaped tip, the stem of the Y being defined by the portions 32, 34 of the arms 28, 24 respectively and the portions of said arms remote from their juncture being spaced apart to form the arms of said Y.

It is to be noted that the arms 24 and 28 are coplanar thereby rendering the tip compact. The heating arm 26 is disposed in the space between the arms of said Y and joined to the stem of the Y at the juncture of the arms thereof. However, it should be noted that the arm 26 is joined only to the tubular arm. The tubular arm 28 is formed from heat conductive metal whereby heat from the arm 26 will be conducted by the arm 28 to its anterior portion.

Due to the jointure of the brass or stainless steel tube 28 to the anterior portion 34 of the arm 24 by means of the brazing or hard solder 36, there is provided a suitable point of heat concentration for melting operations and the solder heating and melting surface of said tip has also been increased.

In order to complete the assembly of the device, a flexible tube 38 formed of rubber or plastic of a length optional with the operator is slipped over the end of the tubular arm 28. The operation of the tip may then be accomplished by applying the extreme end of the Y of the tip to melt the solder and simultaneously blowing air through the hose or tube 38, through the tubular arm 28 to remove melted solder waste from the immediate working surface. The air for cleaning may be supplied orally by the operator of the device by fitting a mouthpiece over the hose 38 if desired. Of course, the air may be from a compressed supply. In order to remove and attach the tip, it is only necessary to remove and attach the heating arms 24, 26 from the conventional end clamps 20, 22 connected to the main heating arms 16 and 18 of the soldering gun.

It should thus be apparent that a simple but yet thoroughly efficient device has been disclosed for pneumatically cleaning the working surface to which solder is being applied. The device is compact, rigid and easy to handle. The air supplying means including the tubular arm 28 is disposed above the soldering gun where it will be out of the way and take up a minimum of space. Further, by removing the upper anterior portion of the conventional soldering tip and replacing it with the tubular arm 28, space is saved and the maneuverability of the soldering gun is greatly increased. Also, the fabrication of the device requires a minimum of expense.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A desoldering tip for an electrically operated soldering gun of the type having a pair of axially projecting parallel main electrically conductive arms with clamps on said arms for detachably mounting a pair of heating arms of a soldering tip; said desoldering tip comprising three generally parallel heating arms each having a heating terminal portion, said terminal portions being joined and providing a single heating element, two of said heating arms being respectively secured in good heat exchange relation each to one of said conductive arm clamps, the third heating arm comprising a tube open at both ends, a source of compressed air connected to said third arm at its end which is remote from its said terminal portion whereby to remove solder waste melted by said single heating element, the terminal portions of said third arm and one of said two arms having coplanar extremities constituting a planar heating surface, the terminal portion of the other of said two arms being fixedly secured to said third arm at a location spaced from said heating surface.

2. The combination of claim 1 wherein said terminal portions of said third arm and of said one of said two arms are spaced from each other and are rigidly connected by a mass of heat conductive material disposed therebetween and which thereby increases the area of said planar heating surface.

3. The combination of claim 2 wherein said one of said two arms and said third arm have angulated inwardly convergent portions merging into their said terminal portions, the other of said pair of arms being straight and having its terminal portion joined to said third arm at the junction of the terminal and convergent portions of the latter.

4. The combination of claim 3 wherein said other of said pair of arms is disposed between and is substantially coplanar with said third arm and said one of said pair of arms.

References Cited by the Examiner
UNITED STATES PATENTS

| | | | |
|---|---|---|---|
| 2,796,507 | 6/1957 | Young | 219—26.1 |
| 2,882,380 | 4/1959 | Campo | 219—26 |
| 2,955,187 | 10/1960 | Campo | 219—26 |
| 3,050,612 | 8/1962 | Eversole | 219—26 |

FOREIGN PATENTS 875,398   8/1961   Great Britain.

WHITMORE A. WILTZ, *Primary Examiner.*
ANTHONY BARTIS, *Examiner.*